July 19, 1949.　　　E. J. McLEARY　　　2,476,425
FISH EGG SELECTOR
Filed May 28, 1945

INVENTOR
Edward J. McLeary
BY *Glenn L. Fish*
ATTORNEY

Patented July 19, 1949

2,476,425

UNITED STATES PATENT OFFICE 2,476,425

FISH EGG SELECTOR

Edward J. McLeary, Spokane, Wash.

Application May 28, 1945, Serial No. 596,391

1 Claim. (Cl. 209—126)

This invention relates to a device for removing dead fish eggs from water in a hatching trough and it is one object of the invention to provide a device by means of which dead eggs may be easily removed from a mass of eggs in the trough without likelihood of also withdrawing live eggs along with the dead eggs.

Another object of the invention is to provide an egg removing device wherein suction is exerted to remove the dead eggs, the tube or nozzle of the device being so formed that there will be low suction at the front end of the nozzle and thus allow the end of the nozzle to be disposed adjacent dead eggs without live eggs being also sucked into the nozzle, suction in the nozzle back of its front end being increased to such an extent that the eggs entering the nozzle will quickly pass through it and into a container where they will be held and prevented from leaving the container through a tube through which water escapes from the container.

Another object of the invention is to provide an egg remover including a receptacle adapted to be hung from a wall of a hatching trough, the neck of the receptacle being closed by a removable plug through which pass tubes, one tube having connected with it a hose provided with a nozzle at its outer end and the other tube being provided with a suction regulating valve and having connected with it a hose in which a suction bulb is disposed for withdrawing water and air from the receptacle and thus causing suction through the first tube so that dead eggs may be removed from a mass of eggs in the hatching trough.

Another object of the invention is to provide an egg remover which is simple in construction, not liable to get out of order, and very easy to operate.

The invention is illustrated in the accompanying drawing, wherein.

This improved egg selector and remover is used for removing dead fish eggs from a mass of eggs in a hatching trough or tank 1. When fish eggs are placed in a hatching trough a number die and these eggs must be removed. The dead eggs are readily distinguished from live eggs by their color and since they rise, due to their lighter weight, and collect at the top of a mass of eggs, they can be easily seen by an attendant looking into the trough. The dead eggs develop a fungus which is liable to contact with and destroy good eggs and it is important that the dead eggs be removed. It is also desirable to remove the dead eggs without taking with them good eggs and this has been found difficult and also very tedious work. Devices operated by vacuum have been used but not found satisfactory as the suction through the nozzle is such that good eggs as well as dead eggs are drawn into the tube or nozzle due to the speed water and eggs are sucked through the nozzle.

The improved egg remover overcomes this objection to vacuum actuated devices, as now constructed, and has been found to successfully remove dead eggs without carrying good eggs with them.

Figures 1, 2:
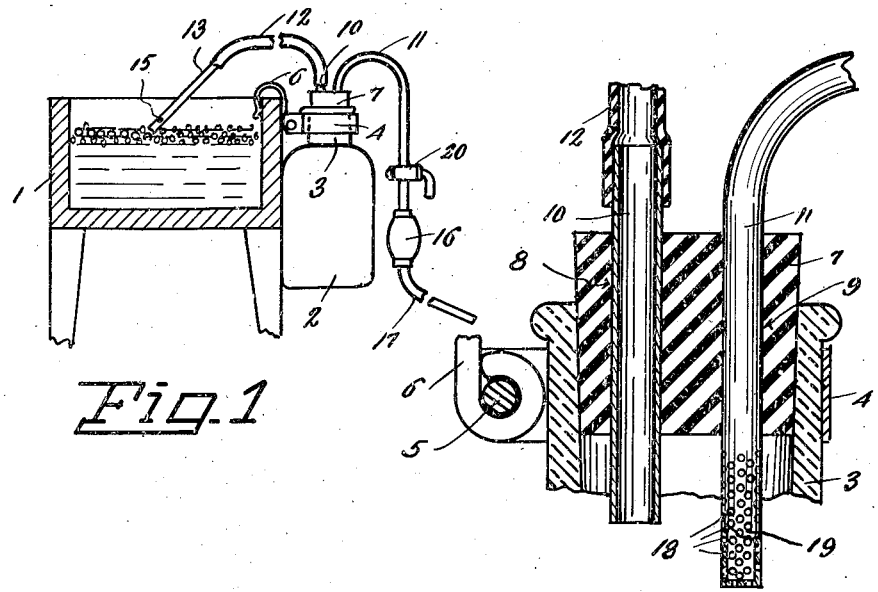
Figure 1 is a view showing a hatching trough in section and the improved egg removing device in side elevation.
Figure 2 is a sectional view upon an enlarged scale taken through the neck of the receptacle and the plug closing the same, tubes extending through the plug being shown in elevation.

The container or egg receptacle 2 constituting an element of the improved egg remover is in the form of a glass jar, having a neck 3 at its upper end about which is secured a ring 4. This ring is secured by a bolt 5 passing through ends of the strip from which the ring is formed and carries a hook 6 for engaging over a wall of the trough and suspending the receptacle or jar at a side of the trough as shown in Figure 1. A plug 7 formed of rubber has tight wedging fit within the neck 3 and through this plug are formed longitudinally extending openings 8 and 9 through which metal tubes 10 and 11 pass and have snug fitting engagement with walls of the openings so that leakage will not occur about the tubes. A rubber hose 12 is engaged with the outer or upper end of tube 10 and this hose is of such length that the attendant may grasp the tubular nozzle 13 at its free end and readily move the nozzle throughout the length and breadth of the trough 1 for removing dead eggs from a mass of eggs in the trough.

Figure 3:
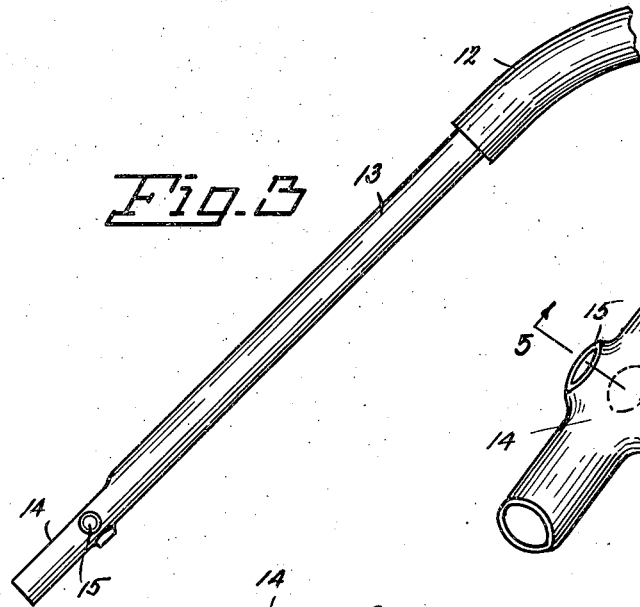
Figure 3 is a side view of the nozzle through which eggs are removed from the hatching trough.
Figure 4:
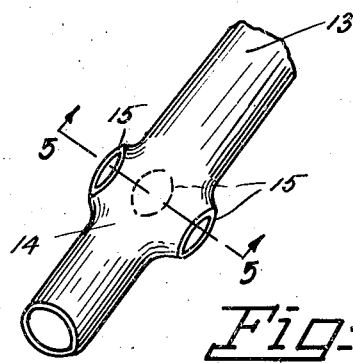
Figure 4 is an enlarged view of the front end portion of the nozzle.
Figure 5:
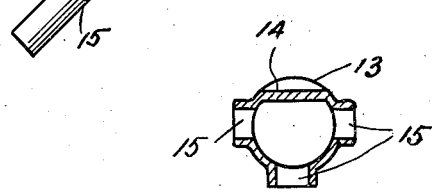
Figure 5 is a sectional view taken transversely through the front end of the nozzle along line 5—5 of Figure 4.

The tubular nozzle is illustrated in detail in Figures 3, 4, and 5 and constitutes an important element of the device. This nozzle may be of any length desired and for a portion of its length from its front end is flattened to form a flat face 14 which reduces the transverse area of the front end of the nozzle. Inlet necks 15 project from the nozzle radially thereof in circumferentially spaced relation to the front end portion of the nozzle between side edges of the flat surface 14 of the nozzle. These necks 15 are in such spaced relation to the front end of the nozzle that when the device is in use and the open front end of the nozzle pressed against a dead egg by a finger placed against the flat face 14, the open necks will be disposed above the surface of water in the trough and air enter the nozzle through the necks. Therefore, suction through the front end of the nozzle will be reduced by air entering the nozzle rearwardly of its front end and a dead egg will be drawn into the nozzle at slow speed and the nozzle can be withdrawn and transferred to another dead egg before good eggs near a dead egg are drawn into the nozzle.

A suction bulb 16 is connected with the outer end of the tube 11 and carries a hose 17 through which water may flow to a suitable place of disposal. The tube 11 is of inverted U-shaped formation and its outer arm is of appreciably greater length than its inner arm, the inner arm having its inner end portion projecting downwardly from the plug and formed with a multiplicity of small perforations 18 so distributed that the inner end portion of the inner arm forms a strainer 19 which prevents eggs in the receptacle 2 from passing through tube 11 with water. A valve 20 interposed in the outer arm of tube 11 controls suction through this tube and regulates the suction through the hose 12 and the nozzle 13. After all dead eggs have been removed from the trough the hook 6 is detached from the wall of the trough and the plug 7 withdrawn so that water and dead eggs in the receptacle may be poured from the receptacle through its neck 3 and the device cleaned and put away until again needed.

Having thus described the invention, what is claimed is:

In a device for removing dead fish eggs from a hatching trough, a tubular nozzle straight throughout its length and having its front end portion flattened along one side and providing a tip of appreciably less transverse area than the remainder of the tube and formed with a flat finger engaging surface, said nozzle being formed with outwardly projecting air inlet necks spaced from its front end and extending laterally from the rear portion of the tip radially thereof in circumferentially spaced relation to each other.

EDWARD J. McLEARY.

REFERENCES CITED

The following references are of record in the file of this patent:

UNITED STATES PATENTS

| Number | Name | Date |
|---|---|---|
| 896,032 | Maas | Aug. 11, 1908 |
| 1,759,729 | Berger | May 20, 1930 |

OTHER REFERENCES

"Modern Laboratory Appliances," published by Fisher Scientific Co. of Pittsburgh, Pa., 1934, page 142, item 3-398. (Copy found in Division 29 of this office.)